A. CARTER.
FREE WHEEL.
APPLICATION FILED MAY 31, 1921.

1,412,336.

Patented Apr. 11, 1922.
2 SHEETS—SHEET 1.

Inventor
Arthur Carter,
By B. Singer
Atty

A. CARTER.
FREE WHEEL.
APPLICATION FILED MAY 31, 1921.
1,412,336.
Patented Apr. 11, 1922.
2 SHEETS—SHEET 2.
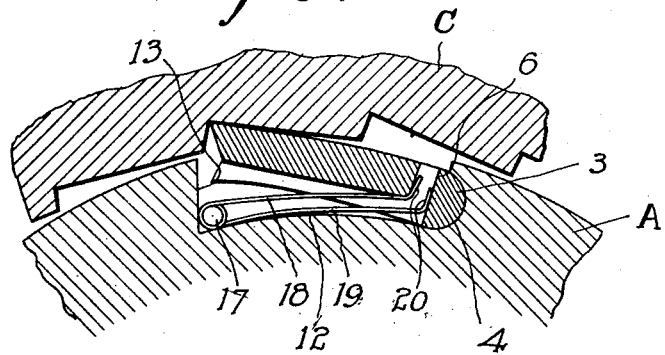
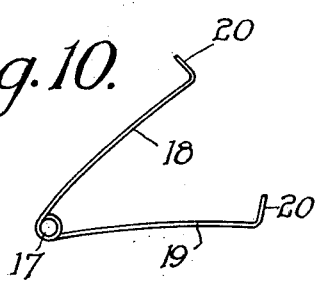
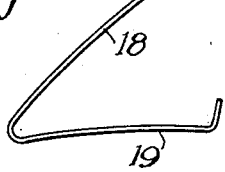
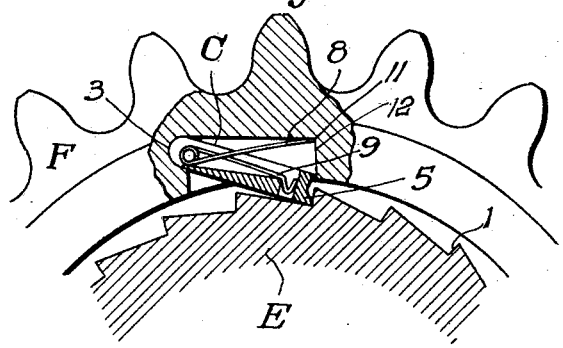
Inventor-
Arthur Carter,
By B. Singer,
Atty.

UNITED STATES PATENT OFFICE.

ARTHUR CARTER, OF BIRMINGHAM, ENGLAND.

FREE WHEEL.

1,412,336.   Specification of Letters Patent.   Patented Apr. 11, 1922.

Application filed May 31, 1921. Serial No. 473,851.

(GRANTED UNDER THE PROVISIONS OF THE ACT OF MARCH 3, 1921, 41 STAT. L., 1313.)

*To all whom it may concern:*

Be it known that I, ARTHUR CARTER, subject of the King of Great Britain, residing at 251 Bordesley Green, Birmingham, in the county of Warwick, England, have invented certain new Improvements in and Connected with Free Wheels, (for which I have filed application for Letters Patent of Great Britain and Ireland, dated December 24, 1919, No. 160,565;) and I do hereby declare the following to be a full, clear, and exact description of the same.

This invention has reference to free wheels and to pawls and pawl springs for the same said free wheels being used on the hubs of cycle wheels for driving the same and in other mechanism.

In a well-known form of free wheel there is a circular central part which is adapted to be fixed to the driving or driven shaft or part and on this is freely mounted, generally on ball bearings, a driving or driven ring made with internal ratchet teeth to be engaged by pawls, usually two in number, which fit in recesses formed in the periphery of the central part and which by means of light springs are caused to turn outwardly on their jointed ends so as to engage with the ratchet teeth of the ring. Said ring is at its outside formed with sprocket teeth to be engaged by a driving chain or is otherwise constructed to be driven or to drive as is well known.

In this construction of free wheel it is usual for each of the springs which act upon the pawls to be made of a piece of fine gauge spring wire fitted in a circumferential slot in the said central part of the free wheel and there retained by one end of the wire spring being bent into a coil through which passes a transverse rivet or pin fitted in a cross hole drilled in the said central part across the slot. The free end of the spring projects beyond the slot and usually engages in a small notch or groove in the back of the pawl and tends to turn the pawl outwardly to engage with the ratchet teeth of the ring part as aforesaid.

It is found in practice that these springs being comparatively long often get disarranged and bent and ineffective when the free wheel has been a long time in wear, and the springs and also perhaps the pawls have to be renewed which is a troublesome matter, and moreover the formation of the slots for the springs and the drilling of the rivet holes and the fitting of the rivets and springs occupies a certain time which adds to the cost of the production of the free wheels.

The object of my invention is to so construct and arrange each of the pawls and its spring that the cost of production of the free wheel will be reduced and the springs and pawls will last longer in wear than the said known kind and moreover the spring will tend to maintain the jointed end of the pawl properly in engagement with the end of the recess in which it fits. My invention is also applicable to that other known form of free wheel in which the ratchet teeth are made on the periphery of the central part which is adapted to be fixed to the driving or driven shaft or part, and the pawls are carried by the driving or driven wheel which is adapted to revolve on a ring or rings of balls surrounding the said central ratchet toothed part.

According to my invention in a free wheel I combine with the two revolving main portions, one or more spring pawls fitting or each fitting in a corresponding recess in one part of the free wheel, each pawl having a light spring, one end of which engages in a hole in said pawl, the spring being bent to a curve by the act of inserting the pawl and adapted to bear against the back and end of the recess so as to turn the free end of said pawl outwardly from the said recess to engage the ratchet teeth and to press the pawl in an endwise direction to retain the jointed end of the pawl in the other end of the recess.

The spring is preferably provided with two arms, one of which engages the back and end of the recess and the other of which engages in the pawl.

The backs of the pawls are preferably provided with longitudinal slots for the springs to work in, said slots each having two sides which prevent lateral movement of the springs.

Referring to the drawings:—

Figure 9 is a sectional side elevation of a combined pawl and spring constructed according to a further modification of my invention, this view also showing in section portions of the free wheel.

Figure 10 is a side elevation of the spring shown in Figure 9 separately.

Figure 11 is a side elevation of a modification of said spring, and

Figure 12 is a sectional side elevation of a combined pawl and spring in accordance with this invention applied to a free wheel of that kind in which the ratchet teeth are formed on the external periphery of the central portion of the free wheel.

Referring first more particularly to Figures 1, 2, 3, and 4, A is the central portion of the free wheel which is adapted to be fixed to the driving or driven shaft or part and B is the driving or driven ring mounted on and revolving about the part A and made with internal ratchet teeth 1 adapted to be engaged by the pawls C which are carried by the central part A. These pawls C are usually two in number arranged at opposite ends of a diameter of the wheel and they are each mounted in a corresponding recess 2 formed in the periphery of the central part A, one end 3 of the pawl being rounded and adapted to fit and turn in the correspondingly rounded end 4 of the recess 2.

Figure 1:
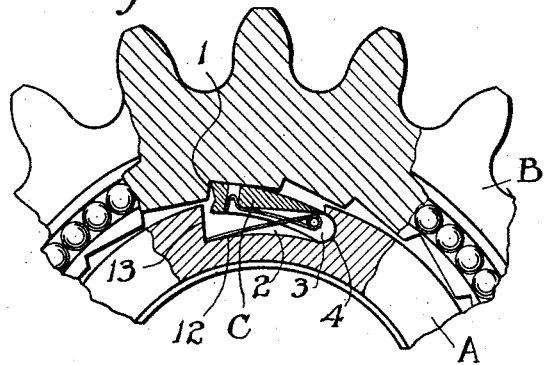
Figure 1 is a part sectional elevation of part of a well known construction of free wheel with my invention applied thereto.
Figure 2:
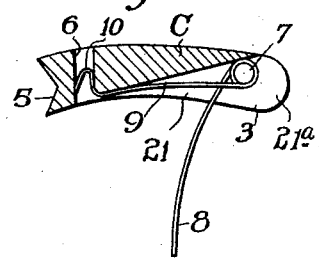
Figure 2 is a sectional elevation of the combined pawl and spring as shown in Figure 1, but detached from the free wheel.
Figure 3:
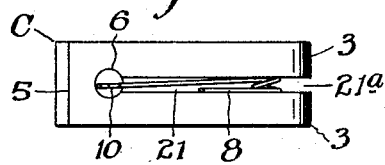
Figure 3 is an inverted plan of the combined pawl and spring shown in Figure 2
Figure 4:
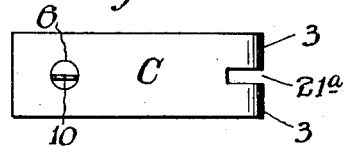
Figure 4 is a plan of the same.
Figure 5:
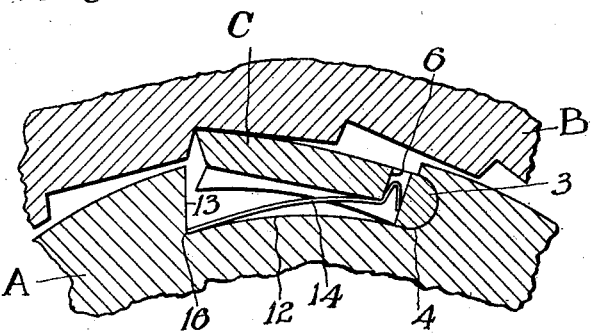
Figure 5 is a sectional side elevation of a pawl and spring constructed in accordance with a modification of my invention, this view showing also portions of the free wheel in section.
Figure 6:
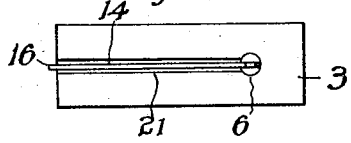
Figure 6 is an inverted plan of the combined pawl and spring shown in Figure 5.
Figures 7, 8:
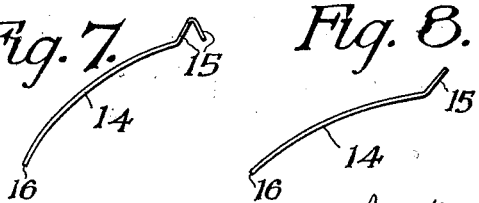
Figure 7 is a side elevation of the spring shown in Figures 5 and 6 belonging to the pawl separately.
Figure 8 is a side elevation of a modification of said spring.

In this arrangement of my invention the pawl C is made with a longitudinal groove 21 at the side next to the bottom of the recess 2 and preferably running along the centre of the pawl cutting through its rounded end 3 and extending nearly to the free end 5 where it communicates with a transverse hole 6 which I provide in the pawl for one end of the spring to engage with. This spring is made from a length of wire preferably somewhat more than twice the length of the required spring, and this is bent preferably about centrally into a coil or loop 7 so as to form two arms, 8, 9, crossing one another near their coil or loop, the end of the arm 9 being bent into a hooked loop shape at 10 so as to engage in the transverse hole 6 with the looped or coiled end 7 of the spring situated in the slot 21 near the jointed end 3 of the pawl and in the longitudinal groove 21 of the same, the arm 9 being also situated in this groove and the other arm 8 which as aforesaid preferably crosses the arm 9 will be free and at its free end 11 will bear against the back 12 of the recess 2 in which the pawl C fits. The wire spring thus formed is made of such a length that the free end 11 of the arm 8 will bear against the end 13 of the recess 2 as in Figure 1, and thus effectually keep the rounded jointed end 3 of the pawl in the correspondingly rounded end 4 of the recess. The cranked end 10 of the arm 9 of the spring which engages in the hole 6 of the pawl C is preferably bent back into a loop shape as shown in Figures 1 and 2 so as to grip the hole 6 and thus be secured therein.

As the free end 11 of the outer arm 8 of the spring which bears against the back 12 of the recess in which the pawl fits has but a very slight movement when the free end of the pawl passes over the ratchet teeth 1, and as the looped end 7 of the spring is situated in the slot 21 of the pawl and is bent into a coil, it follows that the movements of the pawl when in operation cause but very slight bending movements of the spring, and therefore the spring made and applied in accordance with this invention will be practically immune from breaking during the life of the pawl as the spring will last as long as the pawl and can be renewed therewith.

In the modification of my invention illustrated by Figures 5, 6, 7, and 8, the hole 6 in which the end of the spring engages is drilled in the pawl near its jointed end 3 and the spring which fits in the longitudinal groove 21 is merely formed of a short piece of wire forming the spring arm 14 which has one end bent at 15 to fit in the hole 6 in the pawl and thus be secured thereto, the free end 16 of the spring bearing against the back 12 of the recess 2 and thus forcing the free end of the pawl outwardly as required to engage with the ratchet teeth 1. The portion of the spring arm 14 near to the hole 6 is situated in the longitudinal groove 21 which has to be made of just the proper width to receive the wire 14 and as when the pawl C is pressed inwardly in passing over the ratchet teeth, the greater portion of the length of the spring arm 14 is thereby pressed back into the longitudinal groove 21, the sides of the latter effectually prevent any lateral displacement of the spring and maintain it in its central longitudinal position between the pawl and the bottom of the recess in which the pawl fits. The portion 15 of the wire spring 14 which fits in the hole 6 of the pawl can be made of various shapes as it may for instance be merely bent at an angle to the main portion of the spring as in Figure 8 so as to fit and engage in the hole 6, or this end part of the spring may be bent into a V or loop as in Figures 5, 6, and 7 to enter the hole 6 so that the sides of the V or loop part tending to spring apart engage with the sides of the hole 6 and secure the spring therein as in the arrangement hereinbefore described in reference to Figures 1, 2, 3, and 4.

In the further modification of my invention illustrated by Figures 9, 10, and 11 the wire spring is made from a length of wire which is somewhat more than twice the length of the required spring and is bent centrally as at 17 so as to be of somewhat of a hairpin shape forming the two spring arms 18, 19, one or both of which at its or their outer end or ends being also bent as at 20 to engage with the hole 6 in the pawl, the loop or coiled end 17 being situated near the free end of the pawl and the arm 18 being situated further in the longitudinal groove 21 of the pawl, whilst the other arm 19 will bear against the back 12 of the recess 2 in which the pawl fits and will also partly fit in the groove 21. It is preferred for the ends of both spring arms 18, 19 to engage in the transverse hole 6 of the pawl as in Figure 9, so as thereby to effectually prevent either of the arms 18, 19 from being displaced when the free wheel is in operation. The looped end 17 of the spring can be merely a plain single loop as in Figure 11, or, and this is what I prefer, the wire is bent at this part to form one or more coils as in Figures 9 and 10 and moreover the spring is of such a length that the looped end 17 abuts against the end 13 of the recess 2 and thus effectually keeps the other or rounded end 3 of the combined pawl and spring in the correspondingly rounded part 4 of the recess.

It is not necessary that the hole 6 be situated near one end of the pawl, as said hole may if desired be in any other intermediate position between the ends and that arm of the spring which engages with said hole will then be shortened to suit.

It will be evident that my said invention can be similarly applied to that other known form of free wheel in which the ratchet teeth are made on the periphery of the central part which is adapted to be fixed to the driving or driven shaft or part and the pawls are carried by the driving or driven wheel which is adapted to revolve on a ring or rings of balls surrounding the said central ratchet toothed part. An example of this arrangement of my invention is illustrated by Figure 12 where the central part of the free wheel which is made with ratchet teeth is marked E and the part which revolves thereon and carries the pawls is marked F. In this example of my invention, the combined pawl and spring fits in a recess 22 in the ring F and is of a similar character to that above described and illustrated in Figures 1, 2, 3, and 4, but the pawl C is slightly modified in shape as shown so as to adapt it to this particular type of free wheel.

What I claim then is:—

1. A free wheel comprising two concentrically disposed wheel parts adapted for relative movement, ratchet teeth on the one part, a pawl mounted in a recess in the other part and adapted for pivotal movement about one end of said recess, a spring engaging with the pawl to turn the free end thereof outwardly and with the free end of the recess to retain the pawl in pivotal engagement with the end thereof, and inwardly extending side flanges on the said pawl adapted to form a recess for said spring.

2. A free wheel comprising two concentrically disposed wheel parts adapted for relative movement, ratchet teeth on the one part, a pawl mounted in a recess in the other part and adapted for pivotal movement about one end of said recess, a pair of spring arms, one of which is adapted to engage with the pawl to turn its free end outwardly, and the other with the free end of the recess to retain the pawl in pivotal engagement with the end thereof, and inwardly extending side flanges on the said pawl adapted to form a recess for said spring.

3. A free wheel comprising two concentrically disposed wheel parts adapted for relative movement, ratchet teeth on the one part, a pawl mounted in a recess in the other part and adapted for pivotal movement about one end of said recess, a spring of coil form, a pair of arms one at each end of the spring, one arm being adapted to engage with the pawl to turn its free end outwardly and the other with the free end of the recess to retain the pawl in pivotal engagement with the end thereof, and inwardly extending side flanges on the said pawl adapted to form a recess for said spring.

In witness whereof I affix my signature.

ARTHUR CARTER.